(12) United States Patent
Barsky et al.

(10) Patent No.: US 6,340,138 B1
(45) Date of Patent: Jan. 22, 2002

(54) STATIONKEEPING METHOD UTILIZING OPEN-LOOP THRUSTER PULSES AND CLOSED-LOOP AUTHORITY LIMITED MOMENTUM STORAGE DEVICES

(75) Inventors: Michael F. Barsky, Hermosa Beach, CA (US); Thomas M. Tanner, Aurora, CO (US); Loren I. Slafer, Los Angeles, CA (US); Paul D. Williams, San Pedro, CA (US); George B. Semeniuk, San Jose, CA (US); Joseph M. Allard, Chiswick (GB)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/566,571

(22) Filed: May 8, 2000

(51) Int. Cl.⁷ .................................................. B64G 1/28
(52) U.S. Cl. ....................................... 244/165; 244/169
(58) Field of Search ................................ 244/164, 173, 244/165, 169; 364/434.023, 459

(56) References Cited

U.S. PATENT DOCUMENTS 5,222,023 A * 6/1993 Liu et al. ..................... 364/434
5,459,669 A * 10/1995 Adsit et al. .................. 364/459
5,610,820 A * 3/1997 Shankar et al. ............. 364/434

* cited by examiner

Primary Examiner—Peter M. Poon
Assistant Examiner—Timothy D Collins
(74) Attorney, Agent, or Firm—Terje Gudmestad

(57) ABSTRACT

A Stationkeeping Mode for a spacecraft having a gimballed momentum wheel for attitude control in which the stationkeeping is divided into short duration open-loop stationkeeping maneuvers to correct orbital errors, and interlaced with closed-loop momentum management operations to manage momentum stored in the momentum wheel. The sequence of open-loop pulses are spaced to deadbeat a given dominant flexible motion of the spacecraft. Between and during the thruster pulses, the gimbaled momentum wheel is maintained in the closed-loop feedback control using gyro sensor or other inertial reference measurements. Limitations on the range of the momentum storage device and its torque capability are minimized by combining the maneuver thruster pulses with pulses from other thrusters, or by reducing the fire time of one of the maneuver thrusters, to minimize momentum buildup. Thus, thrusters are used for changing orbital velocity and managing momentum through open-loop pulsing with closed-loop momentum refinement, and the momentum storage device controls the attitude with closed-loop attitude feedback.

14 Claims, 4 Drawing Sheets

STATIONKEEPING METHOD UTILIZING OPEN-LOOP THRUSTER PULSES AND CLOSED-LOOP AUTHORITY LIMITED MOMENTUM STORAGE DEVICES

TECHNICAL FIELD

The present invention generally relates to attitude control arrangements for a spacecraft, and more particularly, to improvements in controlling operation of a set of rigidly attached chemical thrusters and a gimballed momentum wheel.

BACKGROUND ART

As a spacecraft orbits the Earth, the position of the spacecraft relative to the Earth must be periodically corrected by firing thrusters to maintain the spacecraft in the desired orbit. During an orbit correction, the spacecraft's attitude must be maintained in a desired direction.

A spacecraft 10 equipped with attitude and orbit control devices is shown in FIG. 1. The orbit of the spacecraft 10 is controlled using thrusters while errors are measured relative to inertial space using gyroscopes. Attitude is controlled using either a gimballed momentum wheel 14 or the thrusters. The computations required to command the wheel or thrusters are performed by an onboard computer (not shown). Alternatively, the spacecraft may use a reaction wheel system (not shown) in place of the gimballed momentum wheel 14. In general, any torque actuation system which has limited control authority and momentum storage capacity on all three axes can be employed.

A spacecraft control system which uses both the thrusters and the gimballed momentum wheel is commonly called Transition Mode because the system is used in transition from a Stationkeeping Mode to a Normal Mode. Transition mode without thrusters is called Wheel Transition Mode. The Stationkeeping Mode is executed by the control system and the attitude is controlled using errors measured relative to inertial space and thrusters to both maintain the attitude of the spacecraft and change the orbital velocity. The Normal Mode is executed after Transition Mode by the control system using azimuth and elevation errors and the gimballed momentum wheel 14 to control the spacecraft attitude as it orbits the Earth with a constant velocity.

In the Normal Mode, the gimballed momentum wheel 14 controls the spacecraft attitude by changing the momentum of the spacecraft about its pitch axis 16, its roll axis 18 and its yaw axis 20. The amount of momentum on a given axis is controlled by changing the rotational speed $\omega_w$ of the momentum wheel 14, the roll gimbal angle $\rho$, and the yaw gimbal angle 65. The inertia of the momentum wheel $I_\omega$ is constant. FIG. 2 shows a momentum wheel and the relationship of the momentum wheel relative to the gimbal angles $\rho$ and $\gamma$ and the rotational speed $\omega_w$ about the pitch axis 16 as defined herein. The moment "H" of the spacecraft (ignoring the orbit spin rate) about the roll and yaw and pitch axes for any given wheel speed $\omega_w$ and gimbal angles $\rho$ and $\gamma$ is as follows:

$$H_{roll} = I_w \omega_w \sin \gamma \cos \rho \approx I_w \omega_w \gamma \quad (1)$$

$$H_{pitch} = -I_w \omega_w \cos \rho \cos \gamma \approx -I_w \omega_w \quad (2)$$

$$H_{yaw} = -I_w \omega_w \sin \rho \cos \gamma \approx -I_w \omega_w \rho \quad (3)$$

The torques, $T_{roll}$, $T_{pitch}$, and $T_{yaw}$, imparted to the spacecraft 10 by the momentum wheel are given by Euler's equation. For small attitude errors, for example, errors less than 5 degrees, the torques imparted to the spacecraft by the momentum wheel 14 are:

$$T_{roll} = \frac{\Delta H_{roll}}{\Delta t} \quad (4)$$

$$T_{pitch} = \frac{\Delta H_{pitch}}{\Delta t} \quad (5)$$

$$T_{yaw} = \frac{\Delta H_{roll}}{\Delta t} \quad (6)$$

These results are used to evaluate the momentum changes, and the torques required to manage the momentum.

Alternatively, the torques may be applied to the spacecraft using thrusters, as shown in FIG. 1. Generally, the thrusters are chemical thrusters of conventional design to produce force levels between 2N and 50N. The thrusters are equipped with valves to switch the force on and off, and the thrusters are not gimballed, but rather rigidly attached to the spacecraft. The thrusters are throttled only to the extent that they may be switched at a duty cycle such that the average force is less than the force associated with continuous operation. Each thruster on the spacecraft applies some torque about each axis. Usually, the thrusters are placed on the spacecraft 10 so that they may be fired in pairs to impart a nearly pure torque about a selected one of the axes, or nearly a pure translation along one of the axes.

Referring back to FIG. 1, thrusters N1–N4 are called North thrusters, thrusters A1–A4 are called Axial thrusters, thrusters E1 and E2 are called East thrusters and thrusters W1 and W2 are called West thrusters. Firing the North thrusters N1–N4 at the orbital nodes reduces orbital inclination. The north thrusters may also be used to apply roll and yaw torques to control the attitude of the spacecraft. The axial thrusters A1–A4 are used to control the pitch and the roll attitude of the spacecraft but do not contribute to orbit inclination. East thrusters E1 and E2 correct for an east drift of the spacecraft and the West thrusters W1 and W2 correct for a west drift of the spacecraft. For a 3000 lb. spacecraft equipped with 5 lb. thrusters in geosynchronous orbit, the inclination maneuvers typically require 60 seconds of continuous thruster fire using 2 thrusters, while the drift maneuver require 3 seconds of continuous thruster fire using two thrusters.

Thruster attitude control has several problems. First, it is necessary to rapidly switch the thrusters on and off as attitude errors develop and subside to deliver sufficiently small torque over an extended period of time. This induces jarring accelerations on the spacecraft which may adversely effect the spacecraft's structural or mechanical elements. Secondly, switching a thruster on and off to deliver small attitude correction torques is limited by the capability/design of the switching mechanism and propellant flow limitations. Hence, the control loop contains a control deadband. Control deadbands tend to induce limit cycle instabilities, and place extremne computational pressures on the throughput of the onboard electronics due to the computational requirements for both selecting and firing the appropriate thrusters.

In addition, the maneuver thrusters generally are not directed exactly through the center of mass of the spacecraft. Therefore, the stationkeeping maneuver adds momentum to the spacecraft. This additional momentum results in attitude errors which are removed by the control system by firing other thrusters or by modulating the maneuver thrusters. Hence, the thrusters are performing attitude control and momentum control simultaneously. The disadvantage of this is that an undesirably high number of extremely short thruster pulses are required from both the north and axial thrusters.

Lastly, the thruster control system must fire axial thrusters in excess of the needs of momentum management, thereby wasting thruster fuel. More specifically, a thruster firing control arrangement which uses axial thrusters A1–A4 (which are orthogonal to the direction of the orbital velocity change) to control the attitude of the spacecraft 10 during the stationkeeping mode wastes thruster fuel. Similarly, all extremely short thruster pulses (<300 msec) are wasteful because thrusters are inefficient for such short fire durations. Unfortunately, the gimbals of the momentum wheel 14 do not have sufficient range to maintain the attitude over a continuous drift or inclination maneuver, so the wheel speed and gimbals are conventionally held constant while the thrusters are used to control the attitude during the thruster maneuvers.

Because the use of the axial thrusters and other short north thruster pulses for momentum management and attitude control of the spacecraft during the Stationkeeping Mode is wasteful of thruster fuel, a need exists for an attitude control arrangement which eliminates as much as possible the use of extremely short north and axial thruster pulses during the Stationkeeping Mode, thereby decreasing the fuel requirements and increasing the life of the spacecraft.

DISCLOSURE OF THE INVENTION

Therefore, it is an object of the present invention to provide a new stationkeeping method and system which eliminates the use of thrusters to maintain the spacecraft attitude during the execution of the stationkeeping mode.

A further object of the present invention is to provide a new stationkeeping method and system which separates maneuver, momentum, and attitude control operations so that a momentum wheel can perform attitude control while a set of thrusters can perform the maneuver and momentum control operations.

Another object of the present invention is to reduce overall fuel usage without increasing attitude errors or excessively increasing the duration of the overall stationkeeping process (less than a half hour).

Yet another object of the present invention is to greatly simplify the real-time operation of stationkeeping maneuvers, thereby reducing throughput requirements on a control processor.

In accordance with these and other objects, the present invention provides a "Transition Mode Stationkeeping" (TMS) substitute for a conventional stationkeeping mode. Under TMS, an orbiting spacecraft would have thrusters which fire to correct orbital errors and manage the total momentum, and a gimballed momentum wheel (or other momentum storage device) to maintain the attitude. A complete maneuver is divided into short duration open-loop maneuver thruster pulses which are combined with closed-loop momentum management thruster pulses. The maneuver pulses are fired open-loop by a maneuver sequencer to correct orbital errors of the spacecraft, while a closed-loop momentum management processor pulses the thrusters to manage the momentum, i.e., level the platform and maintain the rotational speed of the momentum wheel.

To avoid attitude errors in the case of a planned thruster firing not occurring, a thruster phase plane controller may be set up with sufficiently large deadbands so that it does not interfere with correct operation of TMS. The phase plane controller could be operated on the secondary processor to avoid throughput problems.

Thus, the present invention provides a spacecraft attitude control method and system which simultaneously: (1) changes the orbital velocity using fixed chemical thrusters; (2) maintains inertial attitude using momentum storage devices; and (3) manages the momentum in the momentum storage devices. The present invention is particularly applicable to satellites equipped with chemical thrusters that are rigidly attached to provide a force in a predetermined direction relative to the satellite, a gimbaled momentum wheel or other 3-axis momentum storage device for attitude control, a 3-axis inertial reference such as orthogonal gyros, and a processor to compute feedback control. Furthermore, in the preferred embodiment, the maneuver thrusters are augmented by other similar thrusters with the authority necessary to offset the momentum induced by the maneuver thrusters.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

The present invention is directed to the stationkeeping mode for a body stabilized spacecraft having a gimballed momentum wheel for attitude control. Normally, this is not possible because either the momentum induced by maneuver thrusters saturates the momentum wheel gimbals, or the transients are too large for the torques generated by a gimballed momentum wheel. Typically, an inclination maneuver performed during the stationkeeping mode is approximately 60 seconds in duration. Drift maneuvers are typically three second long, but induce larger transients due to the arrangement of solar panels along the pitch axis. In addition, attitude control during stationkeeping maneuvers is performed using thrusters which subject the spacecraft to random accelerations which have the potential of adversely affecting the onboard electronics.

Figure 1:
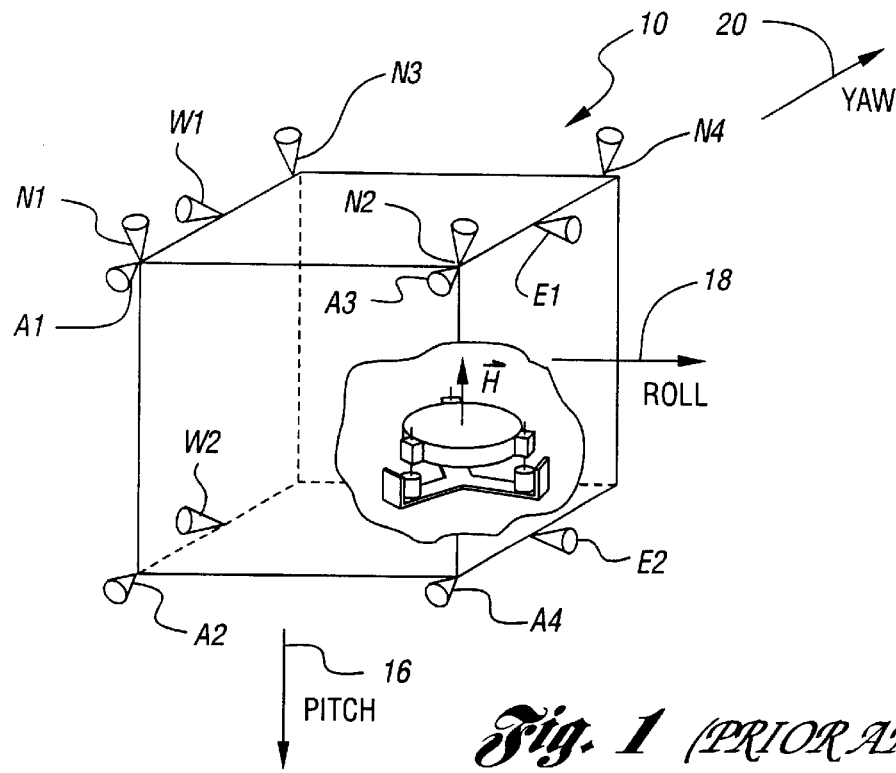
FIG. 1 is a perspective view of a spacecraft having a conventional gimballed momentum wheel and thrusters.
Figure 3:
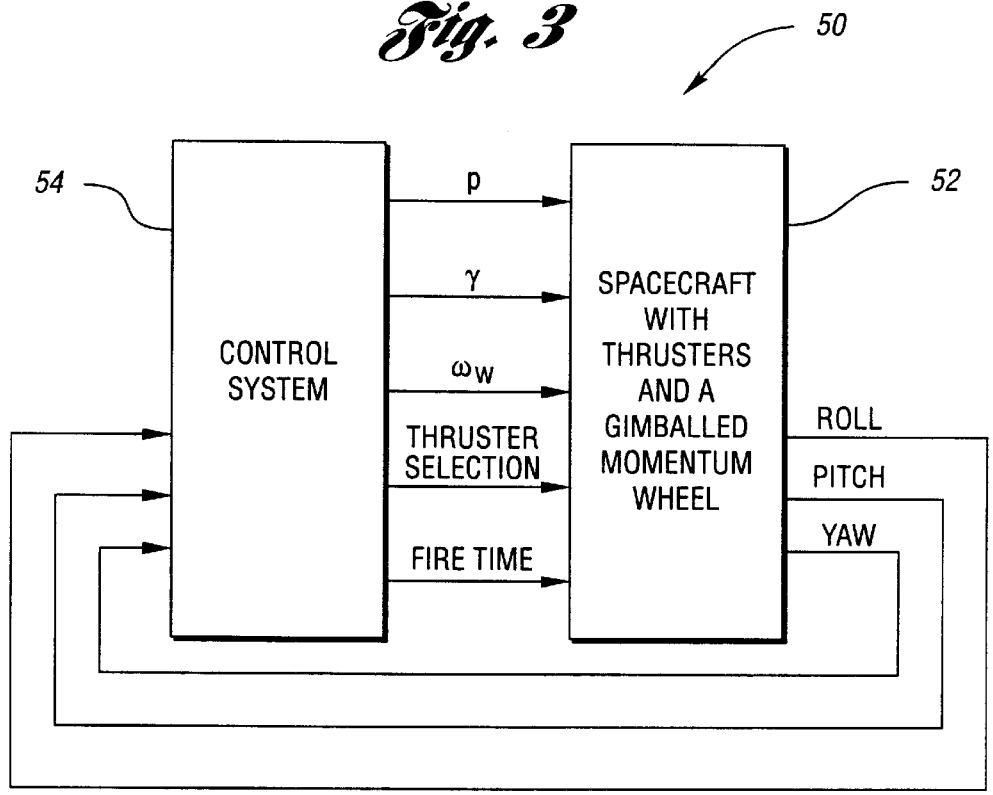
FIG. 3 is a block diagram of the spacecraft control system in accordance with the present invention.
Figure 2:
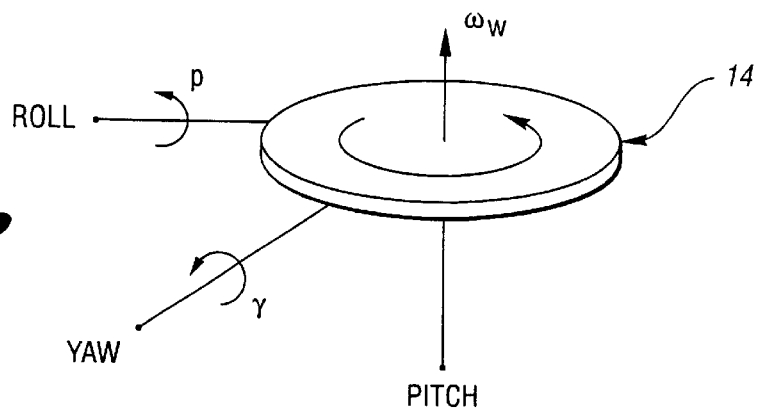
FIG. 2 is a perspective view of a momentum wheel.

Referring to FIG. 3, a basic block diagram is shown for a stationkeeping control system 50 in accordance with the present invention. The spacecraft, thrusters, and gimballed momentum wheel of FIG. 1 are identified by block 52. The attitude of the spacecraft during the stationkeeping mode is controlled by a control system 54 which outputs the desired roll gimbal angle ρ, the desired yaw gimbal angle 65, and the desired rotational speed $\omega_w$ for the momentum wheel 14. The rotational speed $\omega_w$ and gimbal angles ρ and γ control the momentum of the moment wheel 14, in accordance with equations (4) and (6). The control system 54 also selects the thrusters to be used for maneuver and momentum management and computes the fire time Δt for each thruster.

Figure 4:
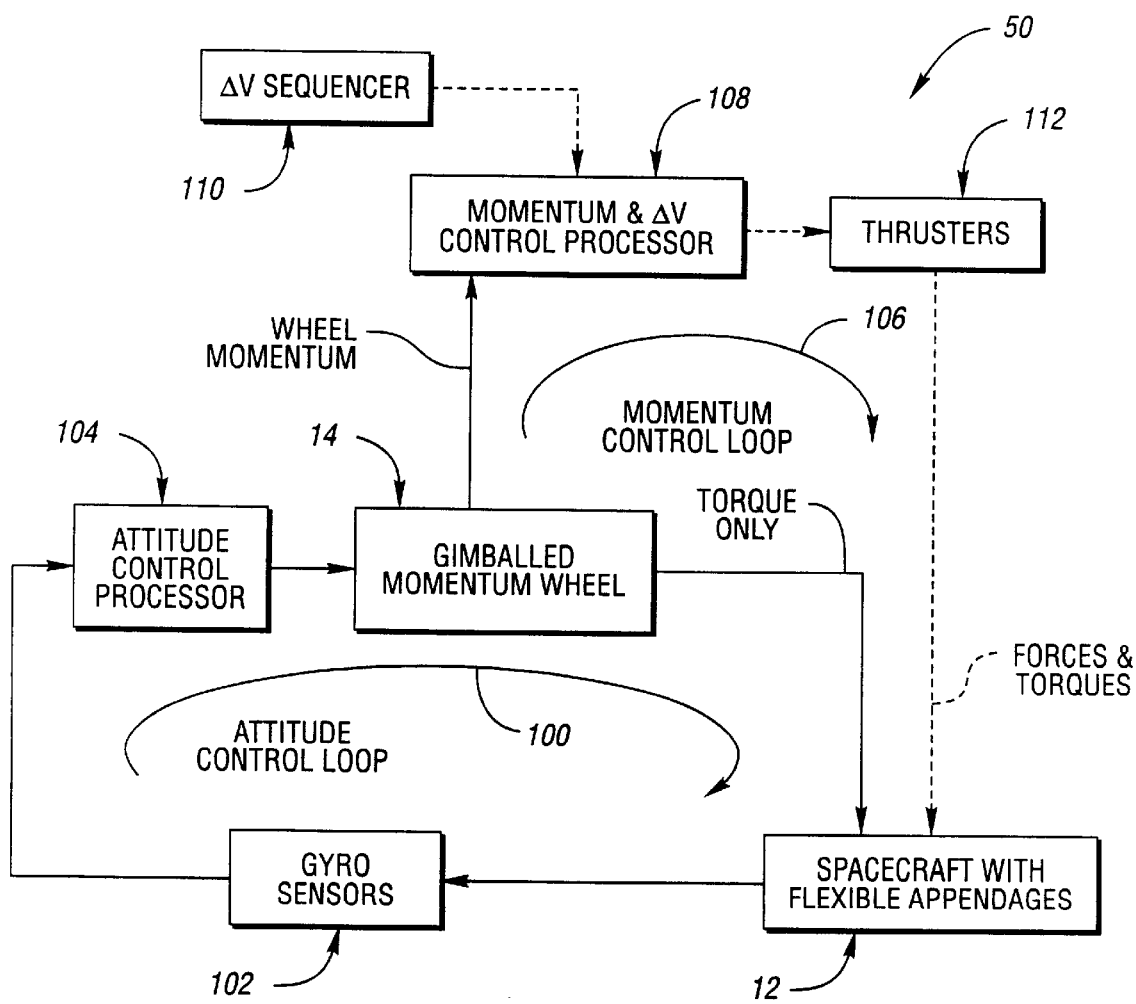
FIG. 4 is a more detailed block diagram of the attitude control system in accordance with the present invention.

Referring now to FIG. 4, a more detailed block diagram is shown for attitude control system 50. As shown, a dashed line connecting two boxes denotes a signal which is updated at the deadbeat frequency, and a solid line connecting two boxes denotes a signal which is continually updated. More specifically, an attitude control loop 100 includes a set of gyro sensors 102 which are arranged to detect attitude of spacecraft 12, and to provide appropriate signals to an attitude control processor 104. As described more fully below, attitude control processor 104 is arranged to control attitude by controlling the gimballed wheel 14 or similar type momentum conserving device to apply only torque to spacecraft 12, thereby avoiding the use of thrusters for attitude control.

As also described more fully below, a momentum control loop 106 includes a momentum and maneuver pulse duration ($\Delta V$) control processor 108 arranged to receive $\Delta V$ firing pulse sequences from a $\Delta V$ sequencer 110, and to control momentum using selected thrusters (generally designated by block 112) to apply corrective torques and forces to the spacecraft. The $\Delta V$ pulses are scheduled at intervals calculated to avoid saturating the wheel and deadbeat motion in any flexible appendages affixed to the spacecraft.

In accordance with the present invention, stationkeeping mode begins by placing the spacecraft in transition mode. Random accelerations caused by the firing of the axial thrusters A1–A4, shown in FIG. 1, are substantially eliminated from the stationkeeping maneuvers by dividing the total desired or necessary maneuver into a sequence of smaller maneuvers combined with thruster pulses generated to manage momentum. For example, an inclination maneuver uses two or four north thrusters to translate the spacecraft along the pitch axis, whereas drift maneuvers are performed using either the pair of East thrusters for an east drift maneuver or the pair of West thrusters for a west maneuver. Momentum is managed similarly by firing other thrusters, or by reducing the duration of one of the maneuver pulses. In both the maneuver and momentum management operations, the wheel maintains attitude under closed loop control.

In the preferred embodiment, the pulses are separated by an odd integer multiple of the deadbeat frequency of the dominant flexible appendages on the spacecraft. The first and second maneuver pulses of the series of pulses are one third and two thirds the duration of succeeding intermediate maneuver pulses, respectively. In addition, the first pulse is not combined with a momentum management pulse. This deadbeat spacing arrangement minimizes attitude errors due to flexible appendages, thereby reducing attitude control requirements on the momentum storage device. Further, by reducing the duration of the first two pulses, startup transient is reduced. The last two pulses in a particular series can be correspondingly reduced in a reverse fashion to minimize shutdown transient.

All intermediate maneuver pulses in a series of pulses are of the same duration, and the series is centered about a desired maneuver time. The duration of the maneuver pulses are selected to be small enough to avoid saturating the momentum storage device and meet pointing specifications. Typically, simulations are performed to verify that pointing requirements are met. In addition, the maneuver pulses should be large enough to require momentum management pulses well above the minimum impulse of the thruster fire system. As described more fully below, the momentum management pulses may vary from pulse to pulse, but such variation is not referenced about zero, but rather is referenced about the duration necessary to offset any momentum bias. Hence, instead of having a typical minimum on-time resolution of about 20 milliseconds, momentum can be managed with thruster pulse duration resolutions of about 1 millisecond.

Thrusters which are to be used for momentum management are selected before a maneuver begins by either using knowledge of the misalignment of the maneuver thrusters with the center of mass, or by calibration. One example of a calibration procedure would be to pulse the maneuver thrusters once and observe the reaction of the momentum storage device. Any combination of thrusters which can restore momentum to the state before the calibration pulse is a candidate for the momentum management. The final choice may be influenced by fuel economy, plume impingement of the thrusters on the flexible appendages, or thruster malfunction.

The on-time of the thrusters required to restore the momentum state becomes the initial value of the momentum management component of the system. The initial duration of the momentum management pulses need not be exact because the system has the capability to correct the fire duration from pulse to pulse. However, if the initial duration is accurate, the mass properties remain constant, and the maneuver duration is short, no further adjustment to the momentum management pulses is required. If automatic adjustment to the momentum management pulses is not required, such as for short drift maneuvers (<6 sec.), the initial momentum management pulses are combined with each maneuver pulse without change. For longer maneuvers (>6 sec), or if mass properties tend to vary during the maneuver, the present invention adjusts the momentum management pulses. An optional second set of thrusters which opposes the first set is desirable for use in situations where momentum induced by the maneuver thrusters changes sign.

Once a set of momentum management thrusters and initial on-times $T_i$ are identified, the momentum in the momentum storage device must be monitored so that the initial on-time can be adjusted. Each thrusters may produce a torque about all three axes, $\tau_{roll_j}$, $\tau_{pitch_j}$, and $\tau_{yaw_j}$. The sum of all of the torques from each thruster is given by $\tau_{roll}$, $\tau_{pitch}$, and $\tau_{yaw}$. Momentum is managed by adjusting the thruster on-times to counter the momentum in the storage device. If the momentum storage device is a gimbaled momentum wheel, equations (1)–(6) may be used to create a system of equations (similar relationships exist for other momentum storage devices), $$\tau_{roll} * \Delta t_x = -\Delta H_{roll} \quad (7)$$

$$\tau_{pitch} * \Delta t_y = -\Delta H_{pitch} \quad (8)$$

$$\tau_{yaw} * \Delta t_z = -\Delta H_{yaw} \quad (9)$$

, where $\Delta t_x$, $\Delta t_y$, and $\Delta t_z$, are the changes in the on-times for the thrusters aligned to provide torque about the x, y, and z axes, respectively.

In general, the thrusters will not be perfectly aligned with the x, y, and z axes, so the time changes will be divided among the thrusters. Note that equations (7)–(9) should be solved as close as practical to the scheduled maneuver pulse to avoid inappropriately changing the momentum. Furthermore, if the measurements of the momentum changes are noisy, these measurements should be filtered to avoid spuriously correcting the momentum. In practice, it may be desirable to simplify the firing logic by grouping the momentum management thrusters into sets which tend to move the momentum in a particular direction, and pulse all of the thrusters in the set for the same duration. This may be accommodated by revising the thruster on-times one thruster set at a time, solving equation (3) by least squares, subtracting the momentum adjustment from the total momentum adjustment needed, and repeating the process for the next thruster set until all of the accumulated momentum is removed. In this way, the momentum management thruster pulses may be combined with the maneuver pulses by firing the momentum management sets slightly before or after the maneuver thrusters with a negligible impact on the momentum management.

Figure 5:
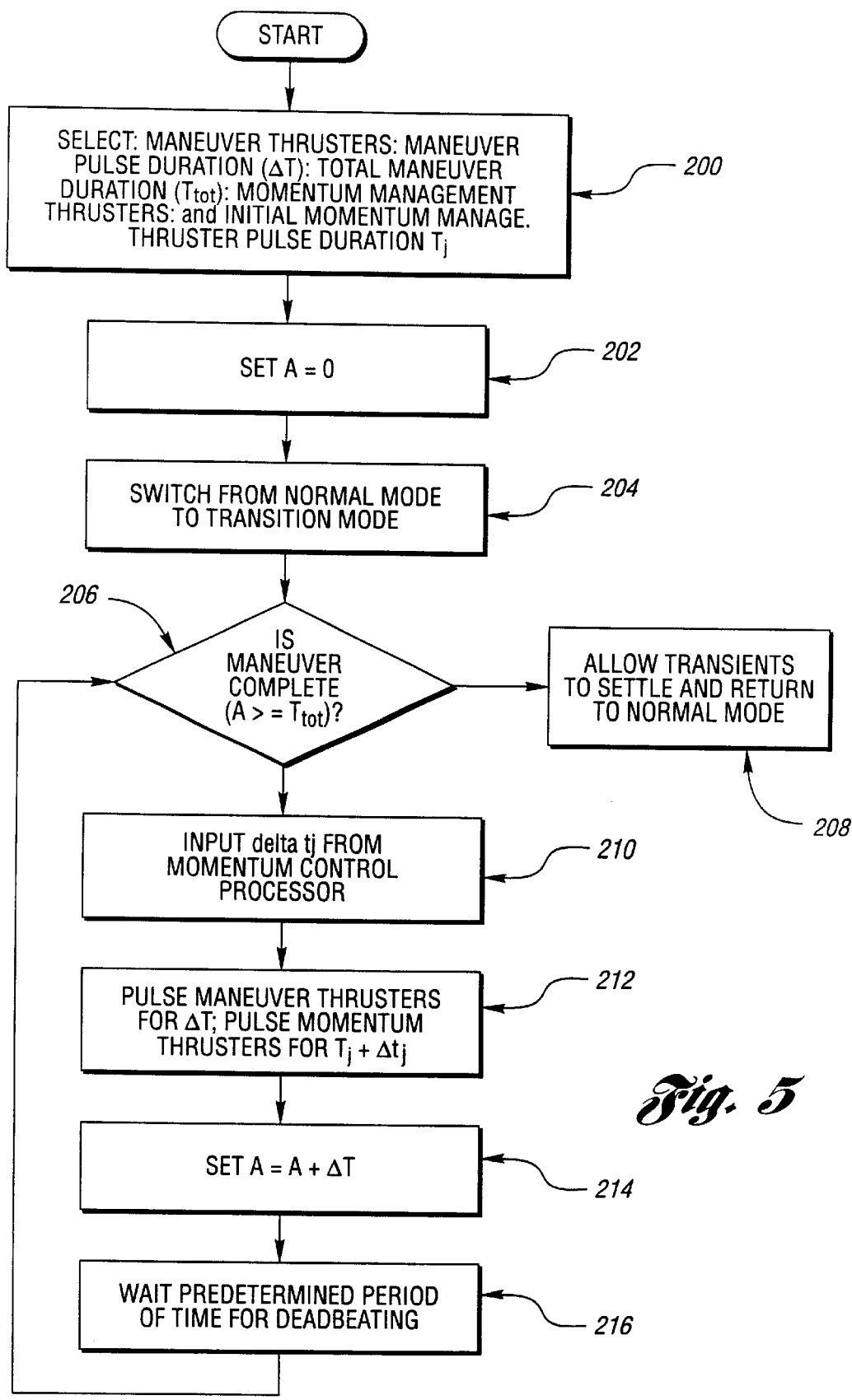
FIG. 5 is a flow diagram showing the improved stationkeeping mode of the present invention.

FIG. 5 provides a flow chart showing the overall stationkeeping process including the momentum management fire time adjustment process in accordance with the present invention. More specifically, at block 200, premaneuver planning is performed by selecting each of the following: maneuver thrusters, maneuver pulse duration ($\Delta T$), total maneuver duration ($T_{tot}$), momentum management thrusters, and initial momentum management thruster pulse durations $T_j$ for j=1, 2, ... n. A maneuver accumulator A is set to 0 at block 202, and the mode is switched from normal mode to transition mode at block 204. As denoted at block 206, a determination is made as to whether the maneuver is complete, i.e., $A \geq T_{tot}$. If so, transients are allowed to settle and the system returns to the normal mode as indicated at block 208.

However, if the maneuver is not complete, at is input from the momentum management algorithm/process as denoted at block 210. Then, at block 212, the maneuver thrusters are pulsed for a duration of $\Delta T$, and the momentum management thrusters are pulsed for a duration of $T_j + \Delta t_j$. The increment maneuver timer is then incremented at block 214 as $A = A + \Delta T$. At block 216, the process waits a predetermined time for deadbeating, and returns to block 206.

Figure 6:
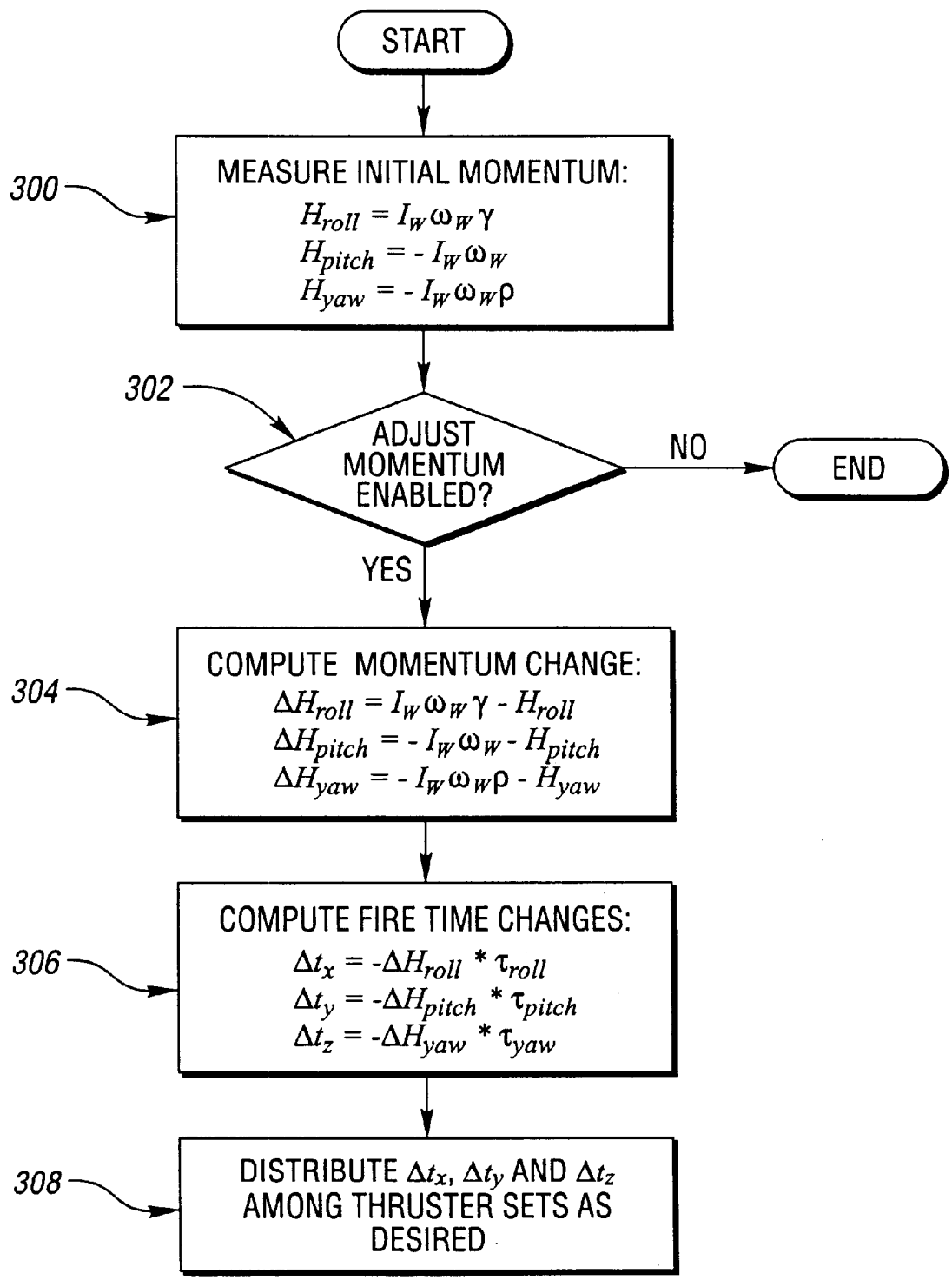
FIG. 6 is a flow diagram showing the momentum management fire time adjustment process in accordance with the present invention.

The input of block 210 is computed by the process shown in FIG. 6. More specifically, after initial momentum $H_{roll}$, $H_{pitch}$, and $H_{yaw}$ are measured at block 300, if momentum adjustment is enabled at block 302, the momentum changes are calculated as denoted at block 304 as follows:

$$\Delta H_{roll} = I_w \omega_w \gamma - H_{roll_0} \quad (10)$$

$$\Delta H_{pitch} = -I_w \omega_w - H_{pitch_0} \quad (11)$$

$$\Delta H_{yaw} = -I_w \omega_w \rho - H_{yaw_0}. \quad (12)$$

At block 306, the thruster fire time changes are computed as follows:

$$\Delta t_x = -\Delta H_{roll} \times \tau_{roll} \quad (13)$$

$$\Delta t_y = -\Delta H_{pitch} \times \tau_{pitch} \quad (14)$$

$$\Delta t_z = -\Delta H_{yaw} \times \tau_{yaw}. \quad (15)$$

Then, at block 308, $\Delta t_x$, $\Delta t_y$, and $\Delta t_z$, are distributed among the thruster sets as desired. The process then returns to block 302.

An important advantage to this momentum management operation is that the momentum wheel is in closed loop control, and the thrusters are fired in open loop control to change the speed and gimbal angle of the momentum wheel in a desired fashion.

While the best mode for carrying out the invention has been described in detail, those familiar with the art to which this invention relates will recognize various alternative designs and embodiments for practicing the invention as defined by the following claims.

What is claimed is:

1. A method for attitude control of a spacecraft having a set of rigidly attached thrusters and a gimballed momentum wheel, said method comprising:

detecting an error in the orbit of the spacecraft;

selecting at least one thruster to be fired as part of an orbit correction maneuver, and a total maneuver duration $T_{tot}$ for execution of the correction maneuver;

selecting at least one thruster to be fired to level and maintain the rotational speed of the momentum wheel, and a momentum management thruster pulse duration $T_j$ for j=1, 2, ... n;

dividing the maneuver duration into a sequence of shorter duration open-loop orbit correcting thruster pulses;

generating a combined sequence of the shorter duration open-loop pulses periodically interlaced with a momentum management pulse; and maintaining a closed-loop management over the generation of the momentum management pulses in the combined sequence.

2. The method of claim 1 further comprising incrementing an accumulator to signify that selected thrusters were fired for a duration $\Delta t$.

3. The method of claim 2 further comprising firing the at least one selected thruster for the duration $T_j$ to control momentum.

4. The method of claim 1 wherein selecting thrusters for the momentum management operation comprises selecting individual or selected pairs of thrusters to impart a momentum to the spacecraft about a selected one of the yaw, roll, and pitch axes.

5. The method of claim 1 wherein the sequence of shorter open-loop pulses is formed as a series of thruster firing pulses separated by an odd integer multiple of a deadbeat frequency of a dominant flexible appendage on the spacecraft.

6. The method of claim 1 wherein a first open-loop thruster firing pulse in the sequence is formed to have a duration equal to one-third the duration of a pulse in a set of intermediary sequence pulses.

7. The method of claim 6 wherein a second open-loop thruster firing pulse in the sequence is formed to have a duration equal to two-thirds the duration of pulse in the set of intermediary sequence pulses.

8. A system for attitude control of a spacecraft having a set of rigidly attached thrusters and a gimballed momentum wheel, said control system comprising:

orbit error detector for detecting an error in the orbit of the spacecraft;

a control processor operative to select at least one thruster to be fired as part of an orbit correction maneuver, and a total maneuver duration $T_{tot}$ for execution of the correction maneuver, said control processor further operative to select at least one thruster to be fired to level and maintain the rotational speed of the momentum wheel, and a momentum management thruster pulse duration $T_j$ for j=1, 2, . . . n; and a sequencer for dividing the maneuver duration into a sequence of shorter duration open-loop orbit correcting thruster pulses, wherein said control processor generates a combined sequence of the shorter duration open-loop pulses periodically interlaced with a set of momentum management pulses, and is responsive to a momentum monitoring arrangement for maintaining a closed-loop management control over the generation of the momentum management pulses in the combined sequence.

9. The system of claim 8 wherein said control processor is further operative to perform the combined sequence by firing the selected thrusters for a duration $\Delta t$, and incrementing an accumulator (A) to signify that the selected thrusters were fired for a duration $\Delta t$.

10. The system of claim 9 wherein the set of momentum management pulses comprise firing the at least one selected thruster for the duration $T_j$.

11. The system of claim 8 wherein said control processor is further operative to select thrusters for the momentum management operation by selecting individual or selected pairs of thrusters to impart a momentum to the spacecraft about a selected one of the yaw, roll, and pitch axes.

12. The system of claim 8 wherein said sequencer forms the sequence of shorter open-loop pulses as a series of thruster firing pulses separated by an odd integer multiple of a deadbeat frequency of a dominant flexible appendage on the spacecraft.

13. The system of claim 8 wherein said sequencer generates a first open-loop thruster firing pulse in the sequence having a duration equal to one-third the duration of a pulse in a set of intermediary sequence pulses.

14. The system of claim 13 wherein said sequencer generates a second open-loop thruster firing pulse in the sequence having a duration equal to two-thirds the duration of pulse in the set of intermediary sequence pulses.

* * * * *